US008698774B2

(12) United States Patent
Mamba et al.

(10) Patent No.: US 8,698,774 B2
(45) Date of Patent: Apr. 15, 2014

(54) METHOD FOR DETERMINING MULTIPLE TOUCH POINTS BY PAIRING DETECTED ELECTRODES DURING A SECOND TOUCH SENSING PERIOD

(75) Inventors: Norio Mamba, Kawasaki (JP); Hideo Sato, Hitachi (JP); Toshiyuki Kumagai, Chigasaki (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 830 days.

(21) Appl. No.: 12/285,896

(22) Filed: Oct. 16, 2008

(65) Prior Publication Data
US 2009/0102813 A1    Apr. 23, 2009

(30) Foreign Application Priority Data

Oct. 17, 2007    (JP) .................. 2007-269986

(51) Int. Cl.
*G06F 3/045*    (2006.01)
(52) U.S. Cl.
USPC ......................................................... 345/174
(58) Field of Classification Search
CPC .. G06F 3/044; G06F 2203/041; G06F 3/0416
USPC ................................................. 345/173–184
See application file for complete search history.

(56) References Cited

U.S. PATENT DOCUMENTS

| 5,305,017 | A * | 4/1994 | Gerpheide | 345/174 |
| 5,565,658 | A * | 10/1996 | Gerpheide et al. | 178/18.02 |
| 5,825,352 | A * | 10/1998 | Bisset et al. | 345/173 |
| 6,856,259 | B1 * | 2/2005 | Sharp | 341/5 |
| 7,564,448 | B2 | 7/2009 | Yi | |
| 2007/0062852 | A1 * | 3/2007 | Zachut et al. | 209/683 |
| 2007/0109279 | A1 * | 5/2007 | Sigona | 345/177 |
| 2007/0109280 | A1 * | 5/2007 | Sigona | 345/177 |
| 2008/0007539 | A1 * | 1/2008 | Hotelling | 345/173 |

(Continued)

FOREIGN PATENT DOCUMENTS

| CN | 1175315 | 3/1998 |
| CN | 1577383 | 2/2005 |
| JP | 2006-179035 | 7/2006 |

OTHER PUBLICATIONS

Office Action in Taiwanese Patent Appln. No. 97136225, dated Feb. 9, 2012 (7 pages), English language partial translation (3 pages).

*Primary Examiner* — Chanh Nguyen
*Assistant Examiner* — Navin Lingaraju
(74) *Attorney, Agent, or Firm* — Antonelli, Terry, Stout & Kraus, LLP.

(57) ABSTRACT

Provided is a capacitance coupling type on-screen input image display device that enables multipoint detection in a short period of time. The on-screen input image display device includes: a detection circuit (4) for detecting a change in capacitance between the plurality of X coordinate electrodes and the plurality of Y coordinate electrodes of the touch sensor (3); a touch panel control circuit (6) for determining a touched coordinate point; and a main control circuit (7) for receiving touch coordinate data from the touch panel control circuit (6). The main control circuit (7) judges occurrence of a user's touch and coordinates of the occurrence from the touch coordinate data, and supplies a display signal corresponding to the judged coordinates to the display device (1) via the display control circuit (2), whereby the display signal is reflected on the display.

7 Claims, 11 Drawing Sheets

(56) References Cited

U.S. PATENT DOCUMENTS

| | | | |
|---|---|---|---|
| 2009/0273579 A1* | 11/2009 | Zachut et al. | 345/174 |
| 2009/0284495 A1* | 11/2009 | Geaghan et al. | 345/174 |
| 2010/0007631 A1* | 1/2010 | Chang | 345/174 |

\* cited by examiner

METHOD FOR DETERMINING MULTIPLE TOUCH POINTS BY PAIRING DETECTED ELECTRODES DURING A SECOND TOUCH SENSING PERIOD

CROSS-REFERENCE TO RELATED APPLICATION

The present application claims priority from Japanese application JP 2007-269986 filed on Oct. 17, 2007, the content of which is hereby incorporated by reference into this application.

BACKGROUND OF THE INVENTION

1. Field of the Invention

The present invention relates to an image display system, in particular, an on-screen input image display system that enables to detect multipoint coordinates in a touch sensor of a capacitance coupling type.

2. Description of the Related Art

An image display device including a touch sensor (also referred to as touch panel) having an on-screen input function for inputting information to a display screen by a touch operation with a user's finger or the like (contact and press operation, hereinafter, simply referred to as "touch") is used for a mobile electronic device such as a PDA or a cellular phone, various home electric appliances, a stationary customer guiding terminal such as an automatic reception machine, and the like. As to the image display device having such a touch input function, there are some known methods including a method of detecting a change in resistance value or capacitance of a touched part, a method of detecting a change in quantity of light at the part shielded by the touch operation, and the like.

It is desired for the image display device including the touch sensor to have a function of multipoint touch detection so that the usability can be improved and that a new application (e.g., image scaling function and the like) can be realized.

FIG. 14 is a structural diagram for explaining an example of a conventional capacitive touch sensor. This touch sensor is called a two dimensional capacitive sensor. For convenience of description, the touch sensor includes a detection cell in which electrodes of five rows (in the X direction) and three columns (in the Y direction) are arranged in two-dimensional matrix via an insulator layer. In FIG. 14, the detection cells are distinguished from each other by their contours. Here, the detection cell means an electrode region for detecting capacitance of a finger or the like. As to the detection cells in the column (e.g., detection cell 84), a column detection electrode (Y coordinate electrode) passes through the detection cells continuously as a back column (linkage electrode), and a row detection electrode (X coordinate electrode, e.g., detection cell 86) is made up of two conductive regions on both sides of the column detection electrode, which are connected by electric wire connection 41.

As to the detection cells in the end column of the detection region (i.e., columns X1 and X3, e.g., detection cell 86), the row detection electrode passes through the detection cells continuously, and the column detection electrode is made up of two conductive regions on both sides of the row detection electrode. In this structure, the column detection electrode and the row detection electrode in each detection cell are connected electrically to each other. The row detection electrodes on both ends of the detection cell are connected to each other via electric wire connections 38, 40, and 41 formed on the outside of the detection region, and hence the electric wire connection does not need to cross the detection region. In other words, it is possible to provide a capacitive position sensor including the detection region having the electrode only on one side of a substrate.

In addition, as for the multipoint detection, there is an input device disclosed in Japanese Patent Application Laid-open No. 2006-179035. The input device disclosed in Japanese Patent Application Laid-open No. 2006-179035 is made up of a first switch group for applying a signal from an oscillator to one direction electrodes (X electrodes) for detection arranged in two-dimensional matrix, a second switch group for retrieving a signal of the other direction electrodes (Y electrode), and a signal detection circuit (AM modulation circuit). In this structure, the signal from the oscillator is supplied to one X electrode selected by the first switch group, and in this state, the second switch group selects the Y electrodes one by one sequentially, whereby the AM modulation circuit detects whether or not an increase in capacitance has occurred in the X electrode. In addition, the X electrode to which the signal from the oscillator should be applied is selected sequentially. This operation is repeated, thereby detecting a change in capacitance of the touched part.

SUMMARY OF THE INVENTION

In the structure and operation disclosed in Japanese Patent Application Laid-open No. 2006-179035, it is supposed that the number of the X coordinate electrodes is m, the number of the Y coordinate electrodes is n, and a period of time for detecting the signal once is t. In this case, a period of time necessary for detecting coordinates of one screen is m×n×t, which causes delayed sampling time. Therefore, it is difficult to apply the structure to an application that requires high-speed coordinate detection (e.g., game device). It is possible to shorten the detection time if the signals of the Y coordinate electrodes are detected sequentially by applying the signal from the oscillator to every X coordinate electrode. However, if two parts of the Y coordinate electrodes should be detected, it is impossible to identify the X coordinate electrode corresponding to each of the Y coordinate electrodes.

An object of the present invention is to provide an on-screen input image display system of a capacitance coupling type that enables multipoint detection in a short period of time.

In order to achieve the above-mentioned object, the present invention provides a system in which capacitances of all X coordinate electrodes and Y coordinate electrodes that are touched in a first period are detected, an operation for determining a combination of the detected X coordinate electrodes and Y coordinate electrodes is performed in a next second period, and coordinates of the touch position are output based on a result of the operation.

According to the present invention, when each of a number of X coordinate electrodes and a number of the Y coordinate electrodes detected in the first period is two or larger, the operation in the second period for determining a combination of the coordinates is performed. In contrast, when one of the number of the X coordinate electrodes and the number of the Y coordinate electrodes detected in the first period is one, the coordinate detection in the first period is continuously performed without performing the operation in the second period.

In addition, according to the present invention, in the second period, a signal to be applied to one of the detected X coordinate electrode or every X coordinate electrode is applied to one of the plurality of detected Y coordinate electrodes, which is to be determined. Further, in the second period, in a state where the signal is applied to the Y coordinate electrode to be determined, the combination of the coordinates is judged by comparing an output signal of the X coordinate electrode that is detected in the first period and is to be determined with the output signal detected in the first period. Then, in the operation in the second period for determining the combination of the coordinates, the X coordinate electrode to be combined with the Y coordinate electrode to which the signal is applied in the second period has a smaller output signal of the X coordinate electrode in the second period than the output signal of the X coordinate electrode in the first period.

(1) The number of times of detecting coordinates in the first period is one for the X coordinate electrode plus one for the Y coordinate electrode. When a period of time necessary for each detection is denoted by t, the detection time of the entire surface of the touch sensor becomes 2×t, which is shorter than the conventional method. (2) If a plurality of points are touched, signals of the X coordinate electrodes and the Y coordinate electrodes of the touch points are detected in the first period, and only the electrode that needs the discrimination is detected in the subsequent second period, whereby the touch detection of the plurality of points can be realized with high accuracy in short time. (3) If a plurality of points are touched similarly and output signals are detected in a plurality of X coordinate electrodes and Y coordinate electrodes in the first period, only the part to be determined is detected again in the second period. Thus, it is possible to distinguish between contacts of a plurality of points and a detection error due to noise or the like. (4) The second period can be used for applying a signal similar to a signal applied to the X coordinate electrode, to the Y coordinate electrode in the Y coordinate region that should not be detected, whereby non-detection region can be set.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Hereinafter, an embodiment of the present invention will be described in detail with reference to the attached drawings.

Figure 1:
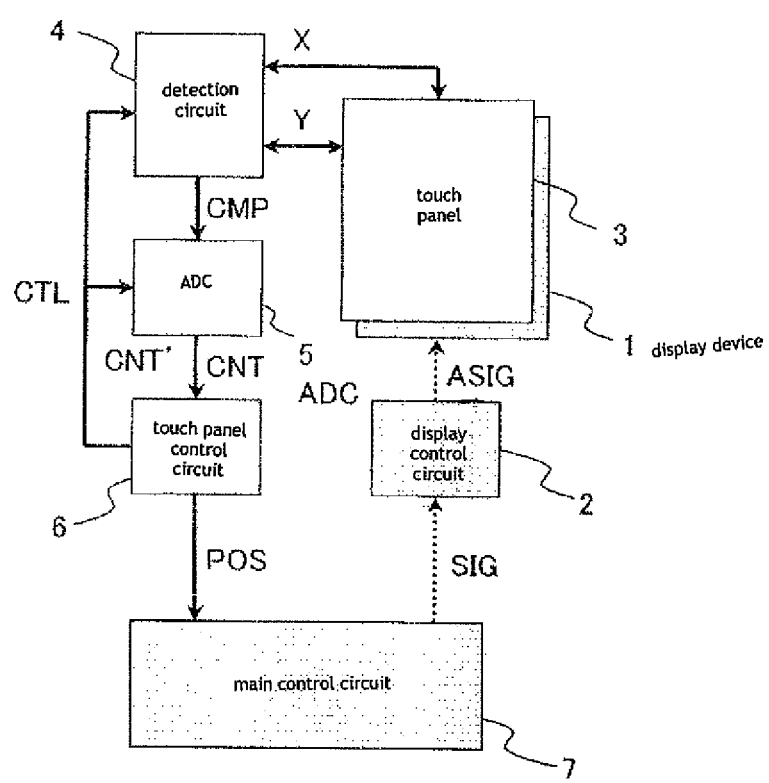
FIG. 1 is a structural diagram of an on-screen input image display system according to Embodiment 1 of the present invention.

FIG. 1 is a structural diagram of an on-screen input image display system according to Embodiment 1 of the present invention. As illustrated in FIG. 1, a touch panel 3 is attached onto a display device 1 in an overlapping manner so as to constitute an on-screen input image display device. The display device 1 is a liquid crystal display panel, an organic EL panel or the like. The touch panel 3 is a capacitive coupling type touch panel. When user's finger or the like contacts with (touches) the touch panel 3, a detection circuit 4 detects a change in capacitance. A detection output signal CMP from the detection circuit 4 based on a result of the detection of the change in capacitance is sent via an analog to digital converter (ADC) 5 to the touch panel control circuit 6, which determines coordinates (X coordinate and Y coordinate) of a touched point. The determined touch coordinate data POS is transferred to a main control circuit (system control circuit made up of microprocessor, CPU or the like) 7 for controlling the entire of the on-screen input image display device.

The main control circuit 7 judges occurrence of a user's touch and its coordinates from the touch coordinate data POS, and supplies a display signal SIG corresponding to the judgment to the display device 1 via a display control circuit 2 to reflect the touch coordinate data POS on the display. The detection circuit 4 and the ADC 5 are controlled by the touch panel control circuit 6.

Figure 2:
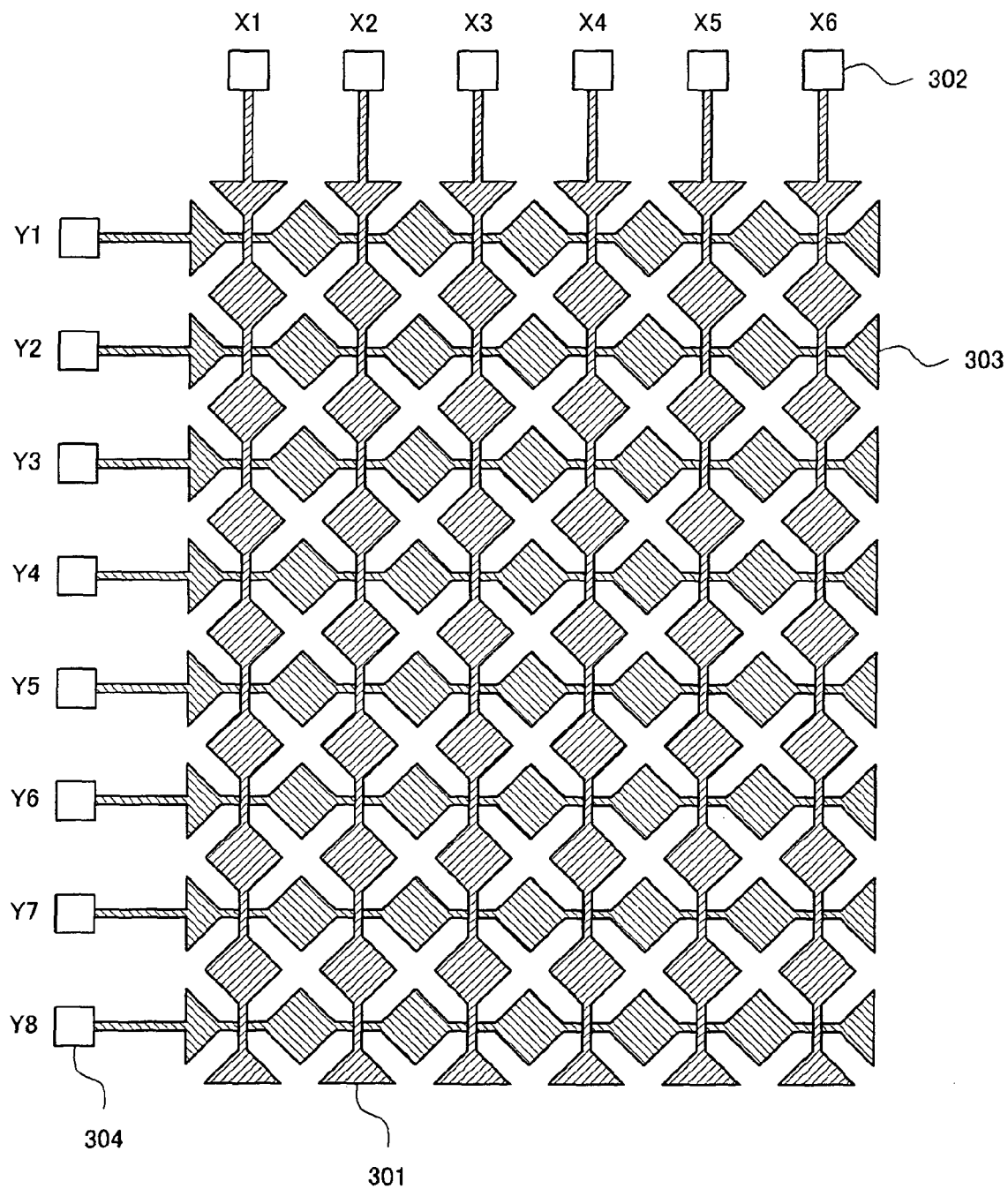
FIG. 2 is a schematic plan view illustrating a structural example of a touch panel constituting Embodiment 1 of the present invention.

FIG. 2 is a schematic plan view illustrating a structural example of the touch panel constituting Embodiment 1 of the present invention. As illustrated in FIG. 2, a plurality of X coordinate electrodes 301 and a plurality of Y coordinate electrodes 303 are disposed so as to cross each other (perpendicularly in normal cases) in order to detect a change in capacitance due to a touch with the touch panel. It is needless to say that an insulator layer or a dielectric layer (not shown) is disposed between the X coordinate electrodes 301 and the Y coordinate electrodes 303. In addition, capacitance of the electrode itself such as interlayer capacitance or fringe capacitance is formed between the X coordinate electrode 301 and the Y coordinate electrode 303. In addition, a protection film (not shown) for protecting the electrode from deterioration is formed on the surface to be touched. The X coordinate electrode 301 and the Y coordinate electrode 303 are connected to the detection circuit 4 of FIG. 1 via corresponding terminals (X coordinate electrode terminal 302 and Y coordinate electrode terminal 304).

Figure 3:
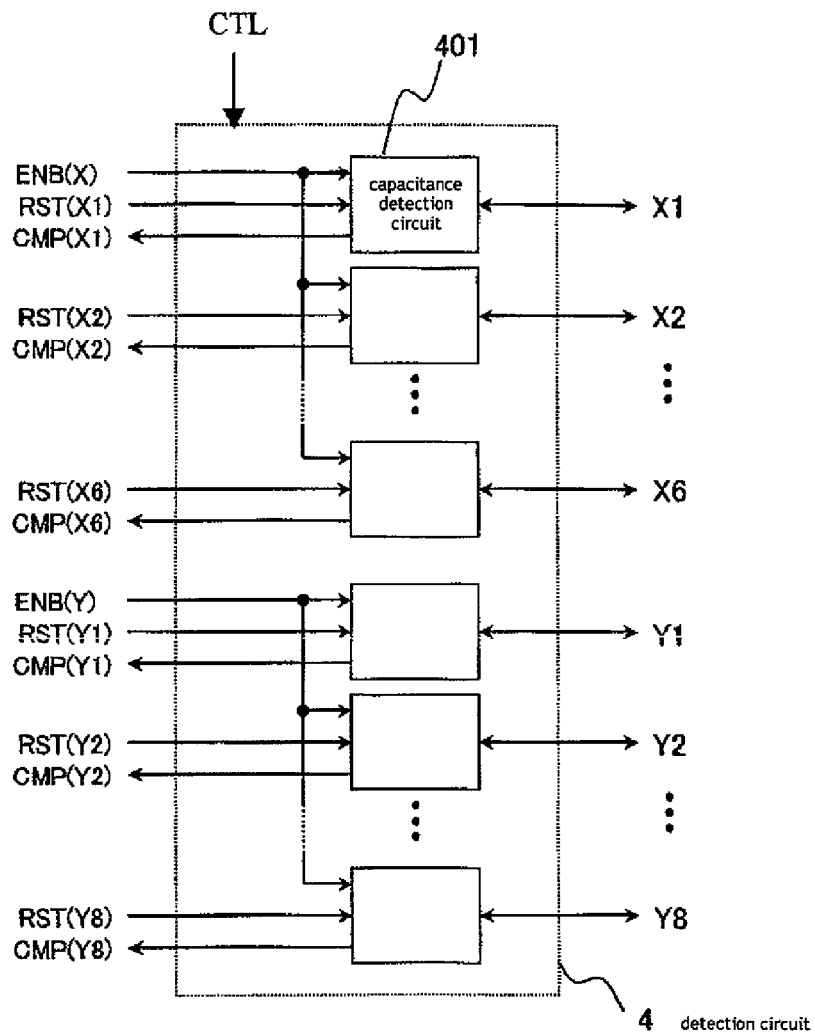
FIG. 3 is a block diagram illustrating a structural example of a detection circuit constituting Embodiment 1 of the present invention.

FIG. 3 is a block diagram illustrating a structural example of a detection circuit constituting Embodiment 1 of the present invention. The detection circuit 4 is provided with a capacitance detection circuits 401 that are connected to the X coordinate electrodes (X1, X2, . . . , and X6) and the Y coordinate electrodes (Y1, Y2, . . . , and Y8), respectively. Each of the capacitance detection circuits 401 is supplied with an enable signal ENB and a reset signal RET from the touch panel control circuit 6 and outputs the detection output signal CMP to the ADC. The enable signal ENB and the reset signal RST are included in a control signal CTL. The detection output signal CMP is a pulse signal whose width varies in accordance with a change in capacitance. Note that this structure should not be interpreted in a limited manner and that it is sufficient if the circuit can detect a change in capacitance between the X and the Y coordinate electrodes at each coordinate as an analog or a digital signal.

Figure 4:
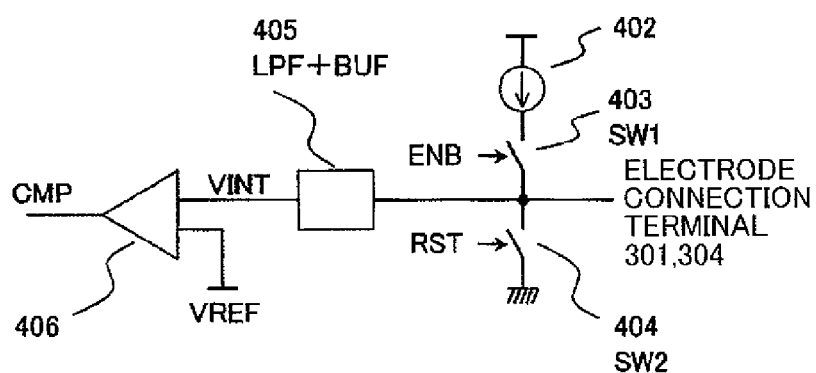
FIG. 4 is a diagram illustrating a structural example of a capacitance detection circuit of FIG. 3.

FIG. 4 is a diagram illustrating a structural example of a capacitance detection circuit of FIG. 3. Reference numeral 402 denotes a current source, reference numerals 403 and 404 denote switches, reference numeral 405 denotes a low pass filter and a buffer amplifier, and reference numeral 406 denotes a comparator. The switch 404 of this circuit is turned on in an initial state by the reset signal RST so that each electrode is reset to be a ground potential GND. When the detection process is performed, the enable signal ENB turns on the switch 403 (while the switch 404 is turned off) so that a capacitance component connected to the X coordinate electrode and the Y coordinate electrode connected to the electrode connection terminals (302, 304) is charged by the current source 402, and a period of time necessary for the charging is detected by the comparator 406. Thus, if the capacitance detected in the X coordinate electrode and the Y coordinate electrode for detecting coordinates is increased by the touch operation, a change in capacitance is reflected on the output result signal CMP of the comparator 406 because a period of time until reaching a certain constant potential is increased.

The output result signal CMP of the comparator 406 is converted into digital data by the ADC 5 of FIG. 1. In the case of this embodiment, the ADC 5 calculates a period of time during which the enable signal ENB is effective (ON) and the output result signal CMP is the low level, and a result of the calculation is output as digital data CNT. An example of the ADC 5 can be realized by providing a counter that counts up the number of pulses of the digital data CNT only in the period of time during which the above-mentioned enable signal ENB is effective and the output result signal CMP is the low level.

Figure 5:
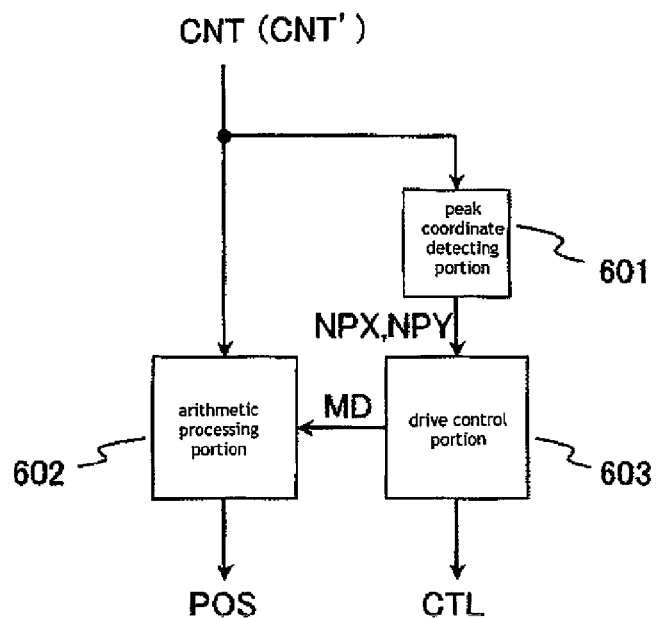
FIG. 5 is a diagram illustrating a structural example of a touch panel control circuit of FIG. 1.

FIG. 5 is a diagram illustrating a structural example of the touch panel control circuit of FIG. 1. In the touch panel control circuit 6, the coordinates (peak coordinates) at which the count value of the output pulse of the X coordinate electrode and the Y coordinate electrode becomes maximum is detected by a peak coordinate detecting portion 601 from the digital data CNT detected based on the signals of the electrodes for detecting the X coordinate and the Y coordinate. A drive control portion 603 judges whether the next detection should be a first detection period (detection of all coordinates) or a second detection period for determining coordinates in accordance with a peak count number NPX of the X coordinate and a peak count number NPY of the Y coordinate. Then, the drive control portion 603 outputs a signal MD for distinguishing the first detection period from the second detection period. At the same time, the drive control portion 603 outputs the control signal CTL corresponding to each of the detection periods.

If the next operation is the first detection period, an arithmetic processing portion 602 determines the coordinates from the transferred digital data CNT and outputs the determined coordinates as the coordinate data POS to the main control circuit 7. On the contrary, if the next operation is the second detection period, the coordinates are determined based on the digital data CNT in the first detection period and the digital data CNT' in the second detection period and are output as the coordinate data POS to the main control circuit 7.

Figure 6:
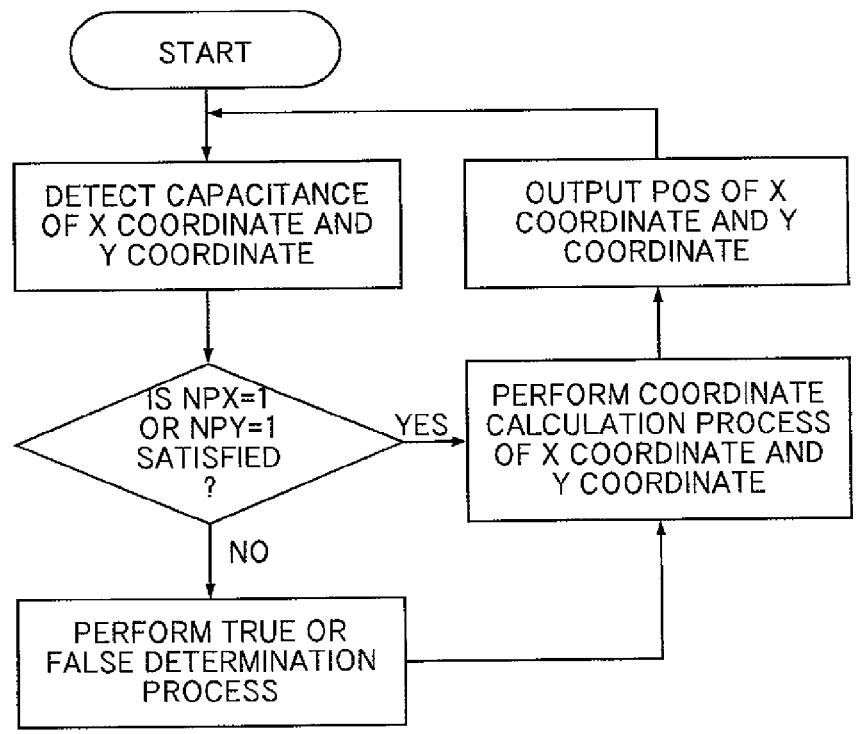
FIG. 6 is a flowchart illustrating a sequence of the touch panel control circuit of FIG. 1.

FIG. 6 is a flowchart illustrating a sequence of the touch panel control circuit of FIG. 1. Here, if a detection point number of the X coordinate or a detection point number of the Y coordinate is 1, it is regarded as a coordinate value, other plurality of detection coordinates are also regarded as coordinate values and are processed as coordinate data of a plurality of points, and then the coordinate data POS is output. Further, if the plurality of points are assumed to include errors, it is determined to be the second detection period as long as one of the X coordinate and the Y coordinate is plural.

In contrast, if both the detection point number of the X coordinate and the detection point number of the Y coordinate are plural, the process in the second detection period is performed to perform true or false determination. Then, the digital data CNT obtained in the first detection period is compared with the digital data CNT' obtained in the second detection period, whereby the coordinate data POS is generated and is output to the main control circuit 7.

Figure 7:
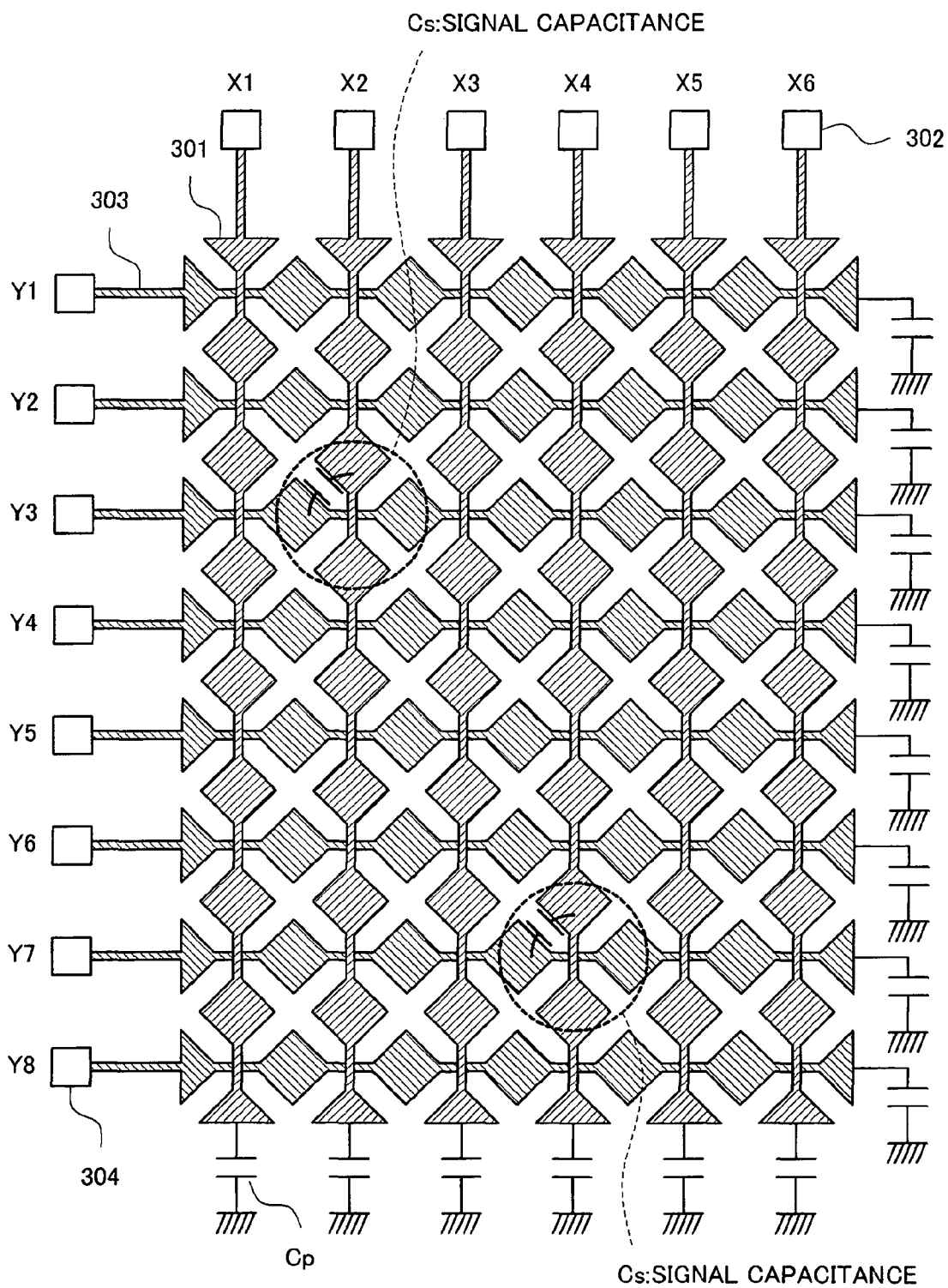
FIG. 7 is a schematic plan view of the touch panel when a plurality of points are touched.

FIG. 7 is a schematic plan view of the touch panel when a plurality of points (here, two points) are touched. The touched part is considered to have a capacitance component added to between the X coordinate electrodes (X1, X2, . . . , and X6) 302 and the Y coordinate electrodes (Y1, Y2, . . . , and Y8) 304. The touch coordinate points are assumed to be on the points (X2, Y3) and (X4, Y7) as an example. However, if the user touches with his or her finger, the area touched with the finger is larger than a tip of a pen. Therefore, capacitance is added to the neighboring plurality of electrodes and is output. As a result, the digital data CNT becomes a distribution with a certain peak-in a case. In this case, it is sufficient to consider the subsequent operation at the coordinate having a peak, as an example. In addition, the electrode of each coordinate point usually has a parasitic capacitance component Cp.

Figure 8:
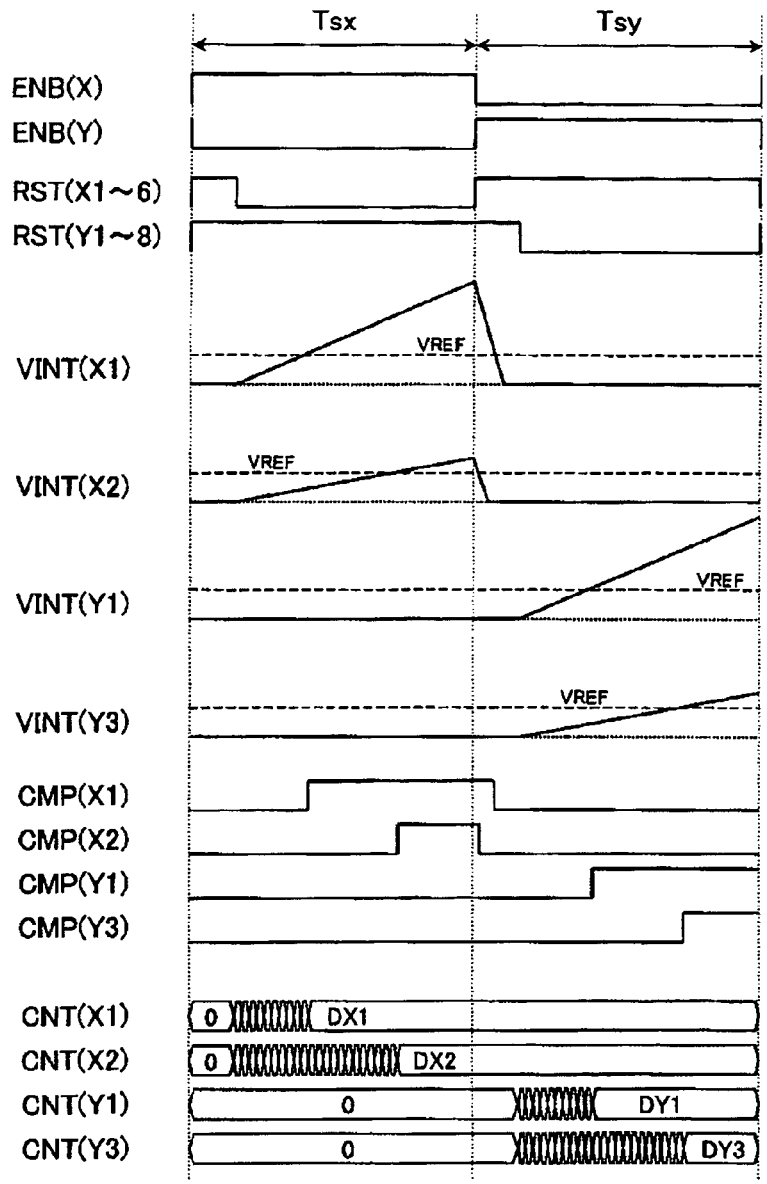
FIG. 8 illustrates waveforms and timings for explaining a first detection period according to Embodiment 1 of the present invention.

FIG. 8 illustrates waveforms and timings for explaining the first detection period in Embodiment 1 of the present invention. The first detection period is a period of time for detecting every signal of the X coordinate electrode and the Y coordinate electrode for detecting the coordinates. As illustrated in FIG. 8, the reset signals RST (X1 to X6, Y1 to Y8) and the enable signals ENB (X) and ENB (Y) in response to the RST (X1 to X6, Y1 to Y8) rise so that the capacitance detection circuit 401 starts to operate. The electrode of the Y coordinate is connected to the ground potential GND in a period Tsx for detecting the electrode of the X coordinate, and the electrode of the X coordinate is connected to the ground potential GND in a period Tsy for detecting the electrode of the Y coordinate. However, it is not limited to the process except for the electrode of the coordinate to be detected (other process such as GND connection or high impedance connection).

Here, the electrodes of the touched and selected part (coordinate electrode X2 and coordinate electrode Y3) has an increased capacitance component, and thus it takes a time to charge, which results in elongated time until a set reference voltage is exceeded. As for the digital data CNT, in response to the elongated time, the digital data CNT (X1, X2) and CNT (Y1, Y3) are also increased so as to satisfy the inequalities "DX2>DX1" and "DY3>DY1". More specifically, for instance, the charging time of the touched X coordinate electrode is illustrated in VINT (X2), and the charging time of the non-touched X coordinate electrode is illustrated in VINT (X1). The same is true for the Y coordinate electrode.

Figure 9:
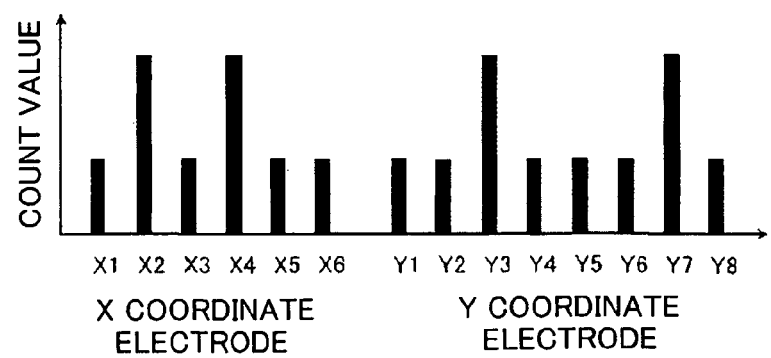
FIG. 9 is a diagram showing a pulse count value of digital data obtained in the first detection period by an operation of FIG. 8.

FIG. 9 is a diagram illustrating a pulse count value of digital data obtained in the first detection period by the operation of FIG. 8. The horizontal axis represents the X coordinate electrodes (X1, X2, X3, X4, X5, and X6) and the Y coordinate electrodes (Y1, Y2, Y3, Y4, Y5, Y6, Y7, and Y8). The vertical axis represents the pulse count value of digital data of the X coordinate electrode and the Y coordinate electrode (simply showed as a count value in FIG. 9). As illustrated in FIG. 9, each of the X coordinate electrode and the Y coordinate electrode has a plurality of (two) peaks. Therefore, the true or false determination whether or not it is a true touch position coordinate point is performed in the second detection period. If this true or false determination is not performed, it is impossible to determine a combination of each of the X coordinate electrodes (X2, X4) and each of the Y coordinate electrodes (Y3, Y7), as well as the detection point number (two to four points).

Figure 10:
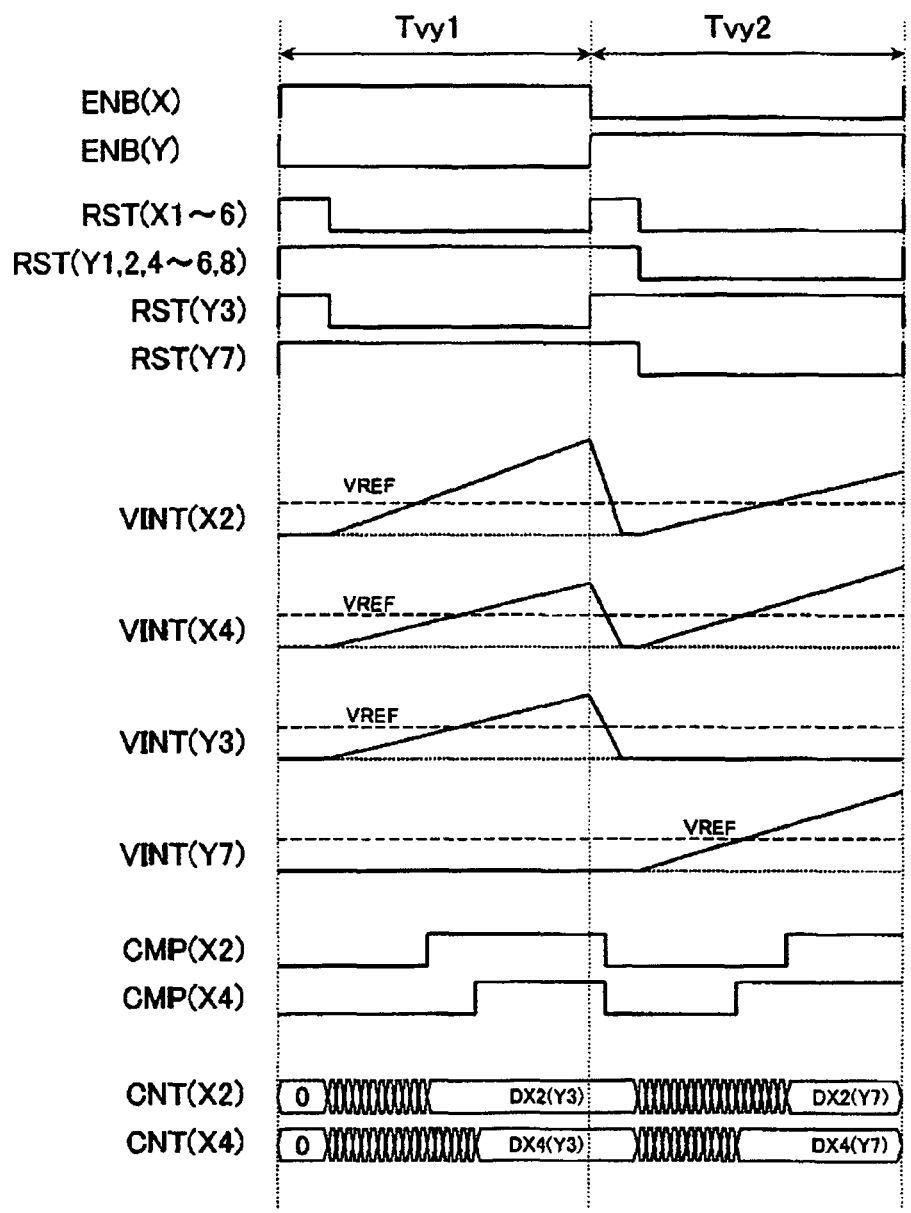
FIG. 10 illustrates waveforms and timings for explaining a second detection period according to Embodiment 1 of the present invention.

FIG. 10 illustrates waveforms and timings for explaining the second detection period according to Embodiment 1 of the present invention. As illustrated in FIG. 10, Tvy1 is a period of time for selecting the X coordinate electrode in contact with the Y coordinate electrode Y3 detected in the first detection period via a capacitance component that is increased by the touching, from the X coordinate electrodes X2 and X4 detected in the first detection period. In this period Tvy1, the operation (of applying current) similar to the detection of the X coordinate electrode is performed only on the Y coordinate electrode Y3 to be a target of the true or false determination, while the other Y coordinate electrodes are connected to the ground potential GND in the same manner as in the first period. In this state, the detection of the X coordinate electrode is performed.

In FIG. 10, since the true or false determination is performed only on the X coordinate electrodes X2 and X4, other X coordinate electrodes are also processed to have the ground potential GND. However, it is possible to perform an operation for detecting every X coordinate electrode. If this operation is performed, a contact capacitance component does not contribute charging and discharging because the Y coordinate electrode Y3 changes in the same phase as the X coordinate electrode connected via contact capacitance (increase in capacitance due to the touching) to the Y coordinate electrode Y3 to be a target of the true or false determination. Therefore, a detection signal (digital data CNT) X2 thereof will be decreased. In the case of FIG. 10, the signal DX2 (Y3) of the X coordinate electrode X2 becomes smaller than the signal DX4 (Y3) of the X coordinate electrode X4. In other words, in the electrode that is touched with a finger or the like, a signal difference between the first detection period and the second detection period is increased.

Period Tvy2 is a period of time for determining the X coordinate electrode in contact with the second Y coordinate electrode (Y7) detected in the first detection period via the contact capacitance. The operation is performed in the same way as in the period Tvy1 so that the true or false determination is performed. Based on a result of the detection in this second detection period, two points of the coordinate (X2, Y3) and the coordinate (X4, Y7) are determined to be the touched coordinates from a result of FIG. 9. The signal POS of this determination result is transferred to the main control circuit 7. After the determination process, a signal state of every coordinate electrode is detected in the first detection period again to determine the touched position.

According to Embodiment 1, a period of time necessary for the touch detection on the front face of the touch panel can be reduced, and hence user's touch inputs can be processed at high speed. The touch detection of a plurality of (two) points can be performed with high accuracy and a stable user interface for input can be realized.

Figure 11A:
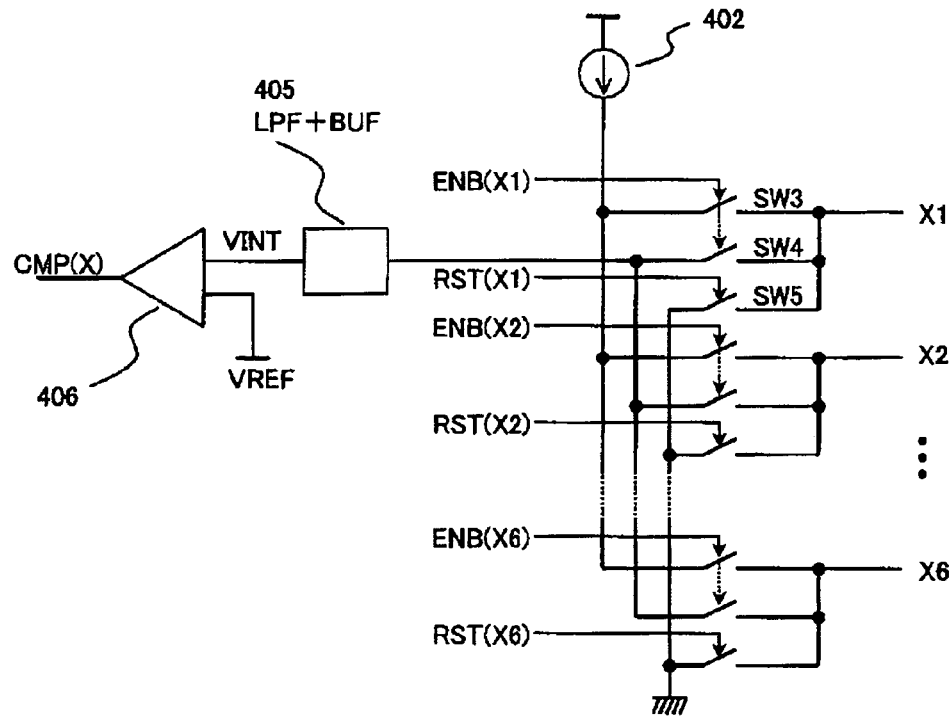
FIGS. 11A and 11B are circuit structural diagrams according to Embodiment 2 of the present invention.
Figure 11B:
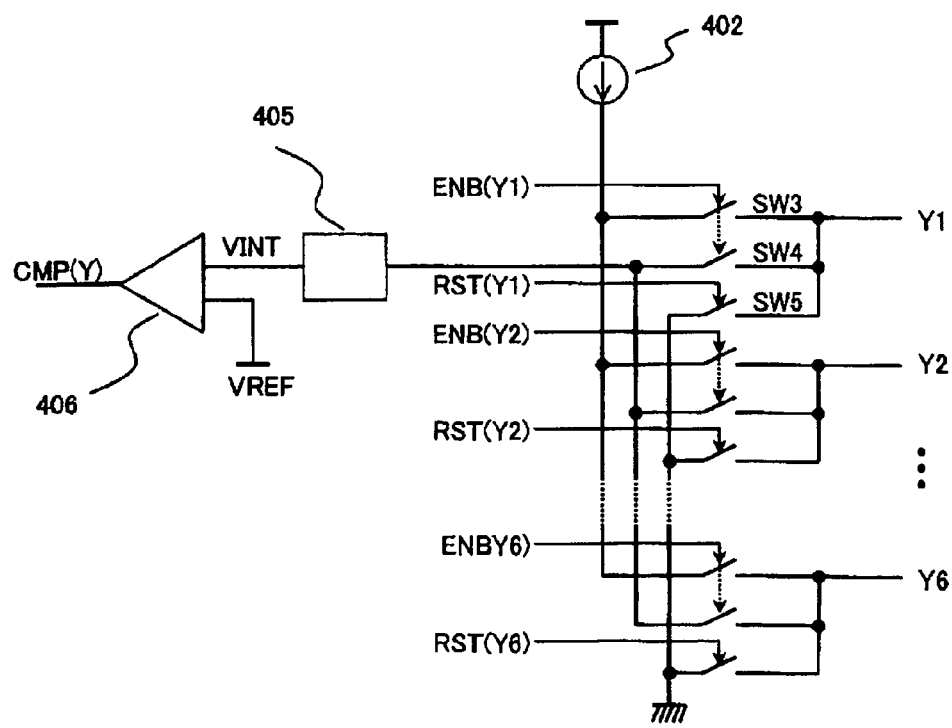

Next, Embodiment 2 of the present invention will be described with reference to FIGS. 11 to 13. In Embodiment 1 described above, the capacitance detection circuit 401 is provided to each of the X coordinate electrode and the Y coordinate electrode as illustrated in FIG. 3. In Embodiment 2, however, as illustrated in FIGS. 11A and 11B, one capacitance detection circuit is provided commonly for a plurality of X coordinate electrodes, and one for a plurality of Y coordinate electrodes, and hence a scale of circuit can be reduced. FIG. 11A illustrates a capacitance detection circuit for the X coordinate electrode, and FIG. 11B illustrates a capacitance detection circuit for the Y coordinate electrode.

The capacitance detection circuit for the X coordinate electrode of FIG. 11A includes selector switches SW3, SW4, and SW5 provided in parallel to the X coordinate electrodes X1, X2, respectively, whereby connections among the current source 402, the low pass filter (plus the buffer circuit) 405, and the ground are switched sequentially by the enable signal ENB and the reset signal RST. In the same manner, the capacitance detection circuit for the Y coordinate electrode of FIG. 11B includes selector switches SW3, SW4, and SW5 provided in parallel to the Y coordinate electrodes Y1, Y2, ..., respectively, whereby connections among the current source 402, the low pass filter (plus the buffer circuit) 405, and the ground are switched sequentially by the enable signal ENB and the reset signal RST.

Figure 12:
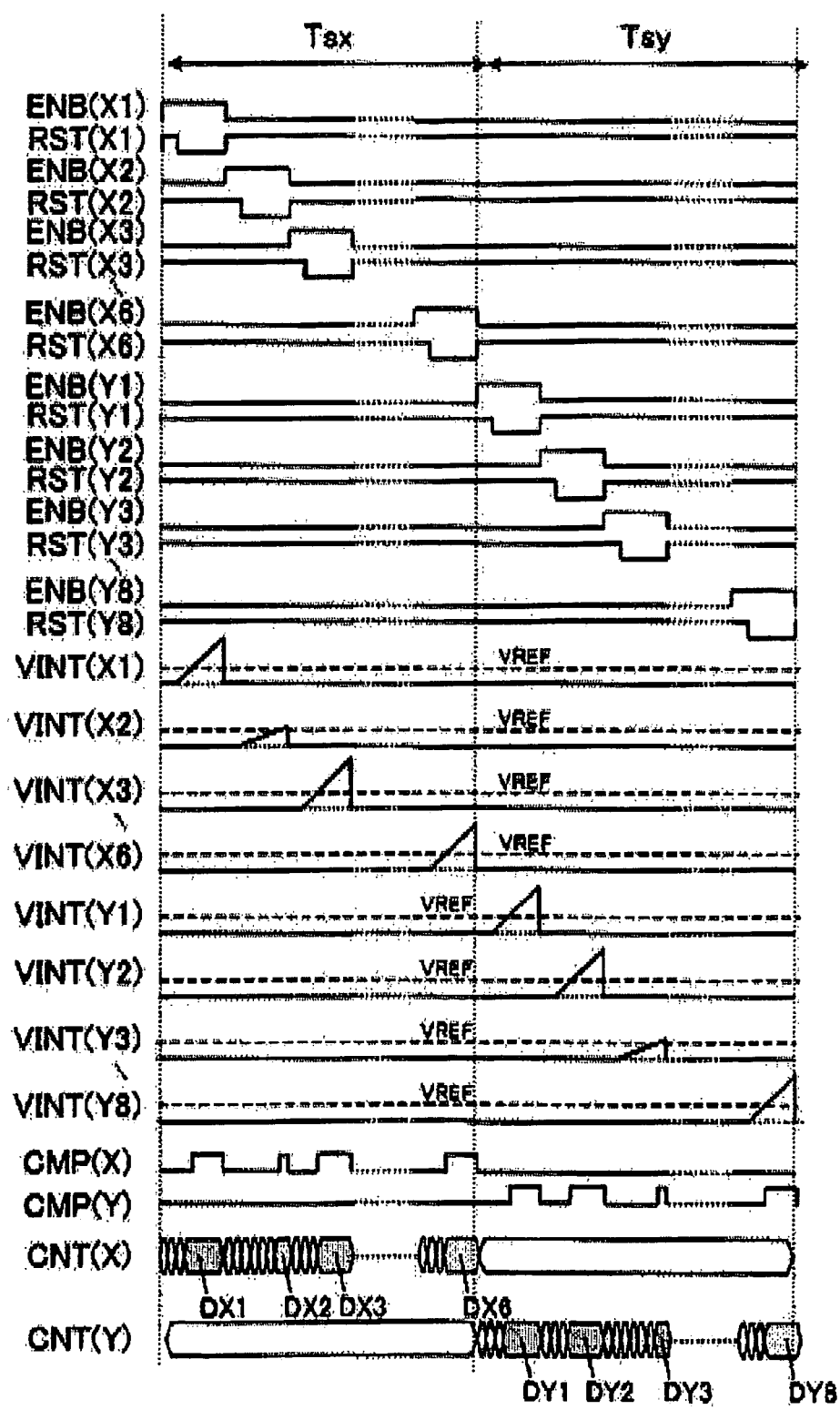
FIG. 12 illustrates waveforms and timings for explaining an operation in a first detection period of FIGS. 11A and 11B.
Figure 13:
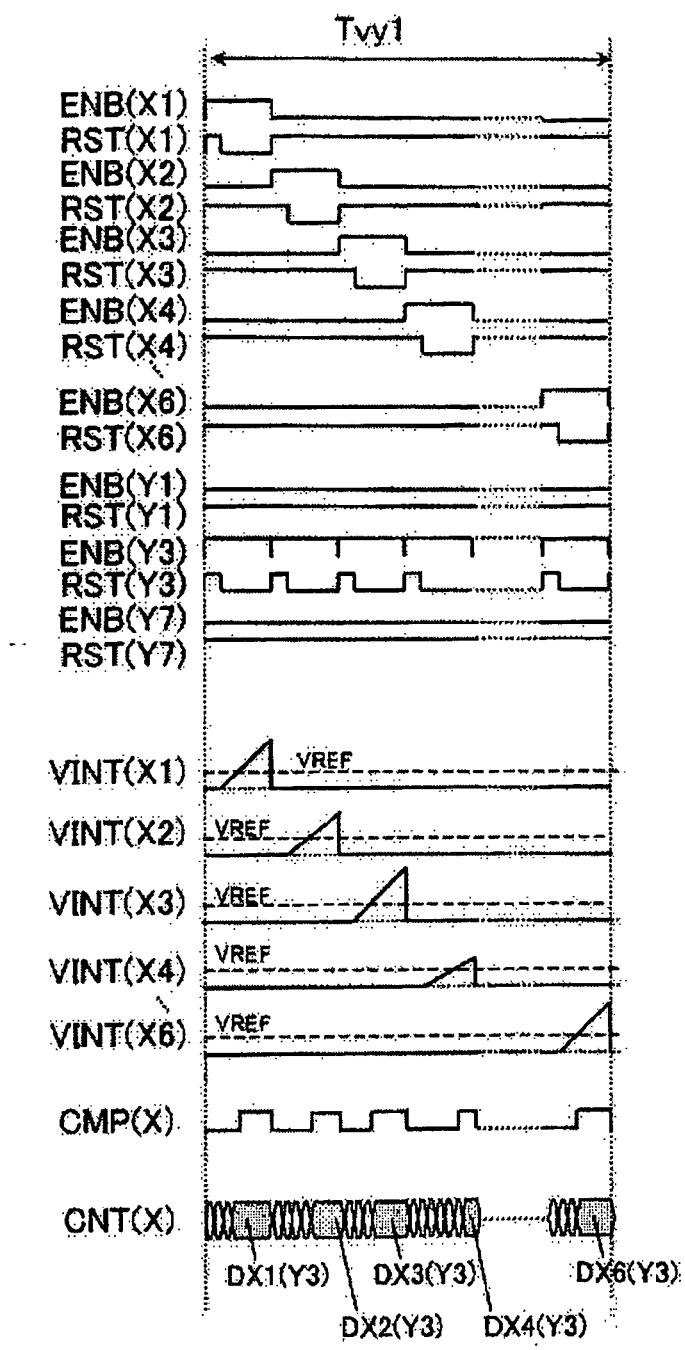
FIG. 13 illustrates waveforms and timings for explaining an operation in a second detection period of FIGS. 11A and 11B.
Figure 14:
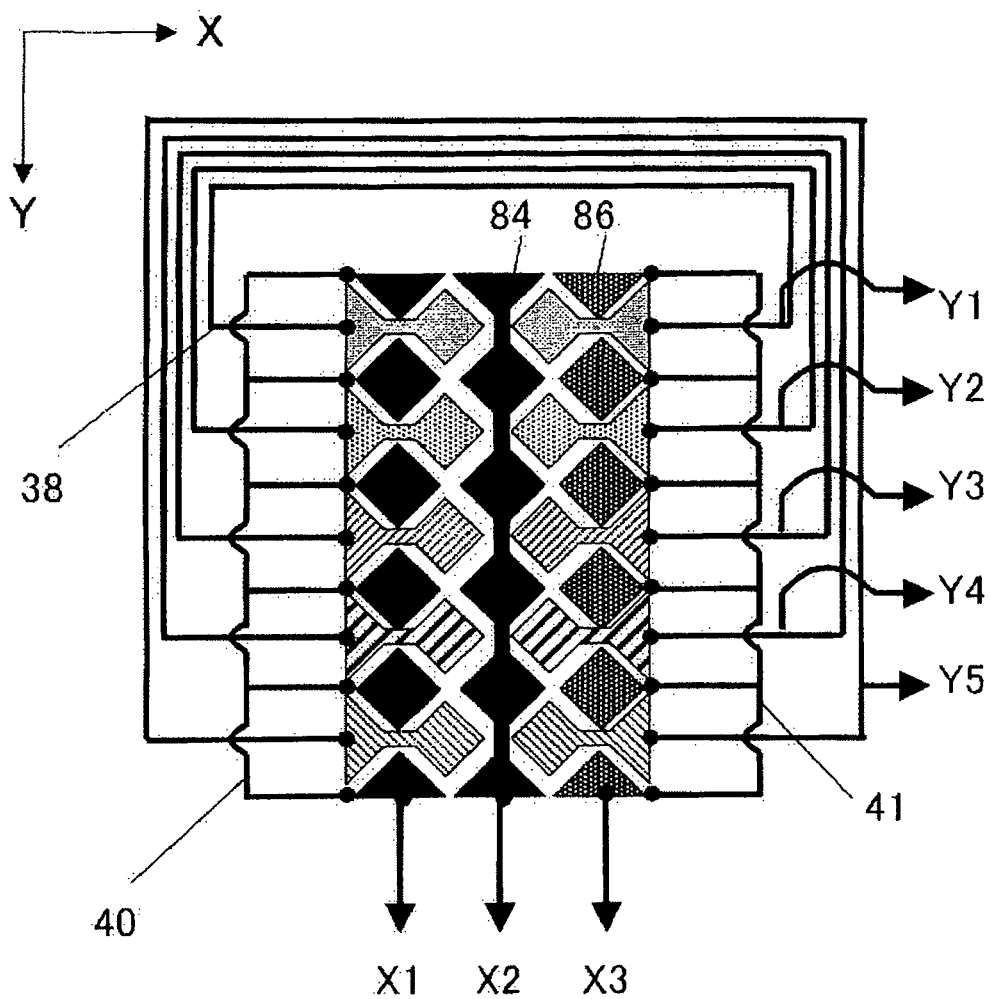
FIG. 14 is a structural diagram illustrating an example of a conventional capacitive touch sensor.

FIG. 12 illustrates waveforms and timings for explaining an operation in the first detection period of FIGS. 11A and 11B. In addition, FIG. 13 illustrates waveforms and timings for explaining an operation in the second detection period of FIGS. 11A and 11B. Though all the X coordinate electrodes are selected in the second detection period in FIG. 13, it is possible to detect only the coordinate electrode of the part on which the true or false determination is to be performed similarly to Embodiment 1.

According to Embodiment 2, even if a detection error occurs due to noise or the like in the first detection period and a plurality of peaks of the pulse count value are detected as described above, it is possible to determine the detection error by the true or false determination performed in the second detection period. In addition, if the operation in the second detection period may be utilized so as to apply a signal similar to a signal during the X coordinate detection to the Y coordinate electrode in the Y coordinate region that should not be detected. Thus, an influence of the capacitance due to the touching on the Y coordinate region that should not be detected can be reduced, and hence the detection region can be selected.

While there have been described what are at present considered to be certain embodiments of the invention, it will be understood that various modifications may be made thereto, and it is intended that the appended claims cover all such modifications as fall within the true spirit and scope of the invention.

What is claimed is:

1. The on-screen input image display system comprising a touch sensor for detecting coordinates of a touch position on a display screen of a display device, the touch sensor being disposed on the display screen of the display device and comprising a plurality of X coordinate electrodes and a plurality of Y coordinate electrodes arranged so as to cross the plurality of X coordinate electrodes via an insulator layer, both for detecting a change in capacitance due to pressing, the on-screen input image display system comprising:

a detection circuit for detecting a change in capacitance between the plurality of X coordinate electrodes and the plurality of Y coordinate electrodes of the touch sensor;

an analog to digital converter for converting a detection output of the detection circuit into digital data;

a touch panel control circuit for determining a touched coordinate point;

a main control circuit for receiving touch coordinate data from the touch panel control circuit and for controlling the on-screen input image display system; and a display control circuit for controlling display on the display device, wherein the main control circuit judges occurrence of a user's touch and coordinates of the occurrence from the touch coordinate data, and supplies a display signal corresponding to the judged coordinates to the display device via the display control circuit, wherein the touch panel control circuit detects, in a first period, an X coordinate electrode and a Y coordinate electrode, in which capacitance changes, and when each of a number of the X coordinate electrodes and a number of the Y coordinate electrodes detected in the first period is two or larger, the touch panel control circuit performs, in a second period, a detecting operation and a true-false determining operation for determining a combination of the detected X coordinate electrode and Y coordinate electrode for which capacitance has been increased by comparing digital data obtained in the first detection period and digital data obtained in the second detection period, and outputs the coordinates of the touch position based on a result of the determining operation; and when one of the number of the X coordinate electrodes and the number of the Y coordinate electrodes detected in the first period is one, the coordinate detection in the first period is continuously performed without performing the determining operation in the second period, wherein a detecting method of the second period is different than a detecting method of the first period, wherein the touch panel control circuit is configured to detect every signal of all of the X coordinate electrodes and all of the Y coordinate electrodes in the first period and to detect only ones of the Y coordinate electrodes determined to be a target of the true or false determination among a plurality of the Y coordinate electrodes in the second period, wherein the touch panel control circuit is further configured to connect others of the Y coordinate electrodes which are not necessary to make the true or false determination to ground during the second period, and wherein the touch panel control circuit is further configured to detect, in the second period, only the X coordinate electrodes among the plurality of X coordinate electrodes which are determined to be necessary to make the true or false determination, while connecting the other X coordinate electrodes of the plurality of X coordinate electrodes to ground.

2. The on-screen input image display system comprising a touch sensor for detecting coordinates of a touch position on a display screen of a display device, the touch sensor being disposed on the display screen of the display device and comprising a plurality of X coordinate electrodes and a plurality of Y coordinate electrodes arranged so as to cross the plurality of X coordinate electrodes via an insulator layer, both for detecting a change in capacitance due to pressing, the on-screen input image display system comprising:

a detection circuit for detecting a change in capacitance between the plurality of X coordinate electrodes and the plurality of Y coordinate electrodes of the touch sensor;

an analog to digital converter for converting a detection output of the detection circuit into digital data;

a touch panel control circuit for determining a touched coordinate point;

a main control circuit for receiving touch coordinate data from the touch panel control circuit and for controlling the on-screen input image display system; and a display control circuit for controlling display on the display device, wherein the main control circuit judges occurrence of a user's touch and coordinates of the occurrence from the touch coordinate data, and supplies a display signal corresponding to the judged coordinates to the display device via the display control circuit, wherein the touch panel control circuit detects, in a first period, an X coordinate electrode and a Y coordinate electrode, in which capacitance changes, and when each of a number of the X coordinate electrodes and a number of the Y coordinate electrodes detected in the first period is two or larger, the touch panel control circuit performs, in a second period, a detecting operation and a true-false determining operation for determining a combination of the detected X coordinate electrode and Y coordinate electrode for which capacitance has been increased by comparing digital data obtained in the first detection period and digital data obtained in the second detection period, and outputs the coordinates of the touch position based on a result of the determining operation; and when one of the number of the X coordinate electrodes and the number of the Y coordinate electrodes detected in the first period is one, the coordinate detection in the first period is continuously performed without performing the determining operation in the second period, wherein a detecting method of the second period is different than a detecting method of the first period, wherein the touch panel control circuit is configured to detect every signal of all of the X coordinate electrodes and all of the Y coordinate electrodes in the first period and to detect only ones of the Y coordinate electrodes determined to be a target of the true or false determination among a plurality of the Y coordinate electrodes in the second period, wherein the touch panel control circuit is further configured to connect others of the Y coordinate electrodes which are not necessary to make the true or false determination to ground during the second period, and wherein the touch panel control circuit is configured to detect every signal of all of the plurality of X coordinate electrodes during the second period.

3. The on-screen input image display system according to claim 1, wherein the detection method of the second period differs from the detection method of the first period in that the total number of X coordinate electrodes and Y coordinate electrodes for which signals are detected in the second period is less than the total number of X coordinate electrodes and Y coordinate electrodes for which signals are detected in the first period.

4. The on-screen input image display system according to claim 1,
wherein the detecting method of the second period is performed only on ones of the coordinate electrodes which are targets of the determining operation.

5. An on-screen input image display system according to claim 1,
wherein the detecting method of the second period includes steps to electrically connect all the coordinate electrodes which are not targets of the determining operation to ground.

6. An on-screen input image display system according to claim 1,
wherein the one touch panel control circuit is configured so that the detecting methods of the first period and the second period can be performed even while touch points are stationary.

7. An on-screen input image display system according to claim 1,
wherein, in the second period, digital data, which corresponds to a period of time during which a voltage of an electrode is below a set reference voltage, is measured for electrodes which are targets of the determining operation while current is applied to them.

* * * * *